United States Patent [19]

Kupersmit

[11] Patent Number: 4,928,630
[45] Date of Patent: May 29, 1990

[54] CONTAINER FOR SHIPPING LABORATORY ANIMALS

[76] Inventor: Julius B. Kupersmit, 299 W. 12th St., New York, N.Y. 10014

[21] Appl. No.: 726,910

[22] Filed: Apr. 24, 1985

[51] Int. Cl.⁵ ............................................. A01K 31/00
[52] U.S. Cl. ....................................... 119/17; 220/83; 229/120.1; 119/19
[58] Field of Search ........................ 119/17, 15, 19, 22; 206/600; 229/6 R, 6 A, 15; 217/17, 36; 220/83

[56] References Cited

U.S. PATENT DOCUMENTS

| | | | |
|---|---|---|---|
| 247,320 | 9/1881 | Dean | 229/41 B |
| 1,917,506 | 7/1933 | Deline | 229/6 A |
| 2,133,021 | 10/1938 | Ferguson | 229/6 A |
| 2,184,854 | 12/1939 | Spooner | 229/6 A |
| 2,398,797 | 4/1946 | Meyer et al. | 119/17 |
| 2,452,150 | 10/1948 | Roberts | 229/6 A |
| 2,776,773 | 1/1957 | Ambrose | 119/17 |
| 2,801,742 | 8/1957 | Farrell | 229/6 A |
| 3,058,445 | 10/1962 | Johnson | 119/17 |
| 3,306,258 | 2/1967 | Hunt | 229/6 A |
| 3,393,858 | 7/1968 | Heel | 229/6 A |
| 3,524,431 | 8/1970 | Graham et al. | 119/19 |
| 3,611,994 | 10/1971 | Bailey | 119/15 |
| 3,695,233 | 10/1972 | Kovarik | 119/19 |
| 3,749,061 | 7/1973 | Connelly | 119/17 |
| 4,130,088 | 12/1978 | Salvia | 119/19 |
| 4,239,149 | 12/1980 | Kupersmit | 229/45 R |
| 4,498,420 | 2/1985 | Botterman et al. | 119/15 |

Primary Examiner—Kenneth J. Dorner
Assistant Examiner—J. R. Hakomaki
Attorney, Agent, or Firm—Charles E. Temko

[57] ABSTRACT

An improved shipping container for laboratory animals such as mice and rats including inner and outer container elements both of which are provided with openings for adequate ventilation. The inner element is formed from a single blank of wire cloth or netting and includes a rectangular box-like element having a cover. The outer element is formed from a unitary blank of single wall corrugated fibrous material, and has openings inside, and upper walls communicating with the inner element, as well as spacing tabs to maintain stacked outer containers in mutually spaced relation, so that ambient air may enter through openings in said side and end walls, and exit through openings in the upper wall of each of the outer elements.

3 Claims, 2 Drawing Sheets

CONTAINER FOR SHIPPING LABORATORY ANIMALS

BACKGROUND OF THE INVENTION

This invention relates generally to the field of shipping containers, and more particularly to an improved form thereof suitable for the shipping of small laboratory animals such as mice and rats under conditions that are both humane and free of contamination. Devices of this general type are known in the art, and the invention lies in specific instructional details which permit low cost of manufacture, convenience in use, and ready expendability after completion of shipping, thereby rendering unnecessary any resanitizing operations.

Prior art devices include a variety of constructions ranging from slatted wood boxes with or without permanently attached screening, wire cages, plastic boxes with foraminous walls and the like. Many of these constructions are less than ideal because of considerations of cost, weight, frangibility, and difficulty in reconditioning the same for subsequent use. Where lightweight constructions have been employed, the useful life of the device has been correspondingly short, and in some cases, the device may arrive after a single use in damaged condition.

Apart from the above considerations, the prior art devices have been difficult to use. The slatted wood boxes referred to above are the most common type, and where permanently attached screening is employed, the attachment means has thin wire staples, the ends of which tend to cut the hands of a user while loading or unloading mice or other laboratory animals therefrom. Such devices are fitted with partitions to maintain the mice physically apart from each other, or at least to maintain mice of the same strain in a common compartment. While loading the boxes, the upper cover is at least partially open, and the mice tend to jump from one compartment into another so that the strains are mixed. Since the mice usually have the same outward physical appearance, once they have comingled, it is not easy to again separate them. Other difficulties have been involved from the standpoint of keeping the boxes in sterile condition.

When the boxes arrive at destination, the unloading of the laboratory animals is accompanied by the same difficulties as loading, in that when the upper cover is opened, all the compartments are simultaneously exposed, and maintenance of genetic integrity requires nimble movement on the part of skilled personnel.

SUMMARY OF THE INVENTION

Briefly stated, the invention contemplates the provision of an improved shipping container for transporting laboratory animals in which most, if not all of the above-mentioned disadvantages have been eliminated.

To this end, the construction includes a first outer container element preferably formed from a unitary blank of single wall corrugated material. When assembled, the outer container element includes a solid bottom wall and orificed side end and top walls permitting the flow of air therebetween. The end walls are formed by overlapping flaps of material and are closed by an expandable synthetic resinous clip. After unloading, the clips may be removed, thereby permitting the outer container element to be flattened for storage and/or return shipment.

Positioned within the outer element, when in erected condition, are a plurality of generally rectangular wire cages forming an inner container element, which are made of welded or adhesively bonded wire cloth, the cages include a foraminous bottom, side, and end walls and a removable cover member. The side and end walls are trapezoidal in configuration, permitting the stacking of the same prior to use. Once removed from the outer container element, the individual inner container elements may be used as storage cages, the foraminous nature of the wire cloth allowing adequate ventilation. When the inner container elements are positioned within an outer container element, air may flow outwardly by convection through the side and end walls of the outer container, through the inner container, and outwardly through the cover of the inner container and the upper wall of the outer container.

The upper wall of each outer container is provided with a generally L-shaped spacing tab which prevents intimate contact between stacked and adjacent outer containers to assist in maintaining ventilation. The lower surface of the bottom wall of the outer container is provided with rectangular tabs which engage the top tabs on an outer container element stacked immediately therebeneath to maintain the containers in vertically aligned condition.

The use of a relatively large size outer element, and a plurality of smaller size inner elements provides many advantages not available in the prior art. All of the components may be readily subjected to gamma ray radiation, prior to use, thus simplifying the problem of maintaining sterility. Animals of different strains may be pre-packaged within the inner container elements, and simultaneously provided with food and water and necessary labeling. The loading of the outer container then may proceed without difficulty, since it is not necessary to open the inner containers at that time, and because of the ventilating coaction of the inner and outer containers, the assembly of relatively large shipments proceeds without difficulty. Upon arrival at destination, unloading is equally simple, and it is possible to leave the animals within the inner container elements for a reasonable period of time, particularly if they will be used for laboratory procedures at the end of that period. Where reuse of either the inner or outer container elements is not required, the outer container element may be flattened, and the inner container elements, after removal of the cover, may be conveniently stacked for disposal.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
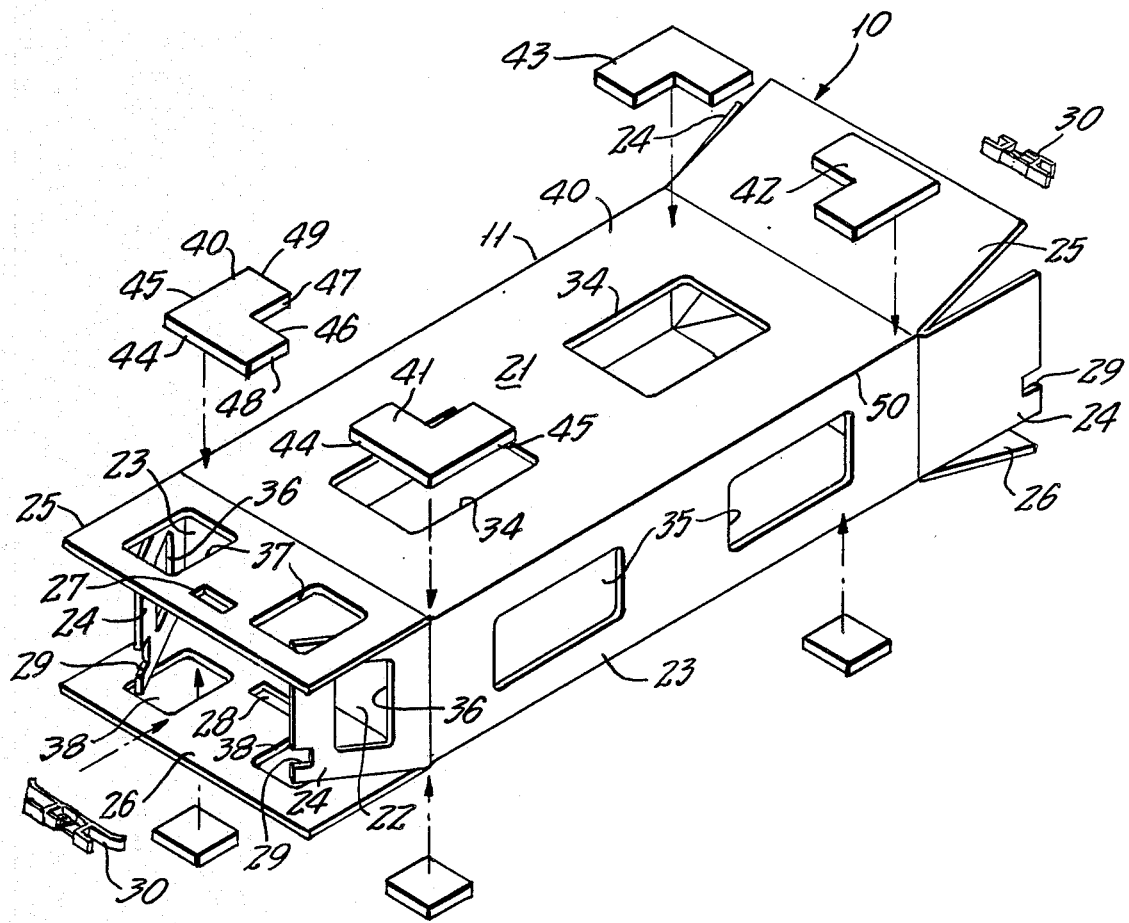
FIG. 1 is an exploded view in perspective of an outer container element forming a part of a preferred embodiment of the invention.

In accordance with the invention, the device, generally indicated by reference character 10, comprises broadly: an outer container element 11 and a plurality of inner container elements 12.

The outer container element 11 is preferably formed from a unitary blank of single ply corrugated paper, and includes an upper wall 21, a lower wall 22, a pair of side walls 23, side wall end flaps 24, upper wall end flaps 25, and lower wall end flaps 26, all of the same being provided with selectively alignable openings 27, 28 and notches 29. Expandable clip means 30 of known type are used to maintain the end flaps 24–26 in engaged position. Removal of the clips 30 permits the outer container element to be flattened when not in use, for storage or return shipment. The clips 30 may be of any suitable type, as for example that disclosed in my prior U.S. Pat. No. 4,239,149 dated Dec. 16, 1980. As disclosed in that patent, frangible seal means (not shown) may be included if desired.

The upper wall 21 is provided with a plurality of generally rectangular openings 34. The side wall 23 includes similarly shaped openings 35, while flaps 24, 25 and 26 are provided with similar openings 36, 37, and 38, respectively.

Figure 2:
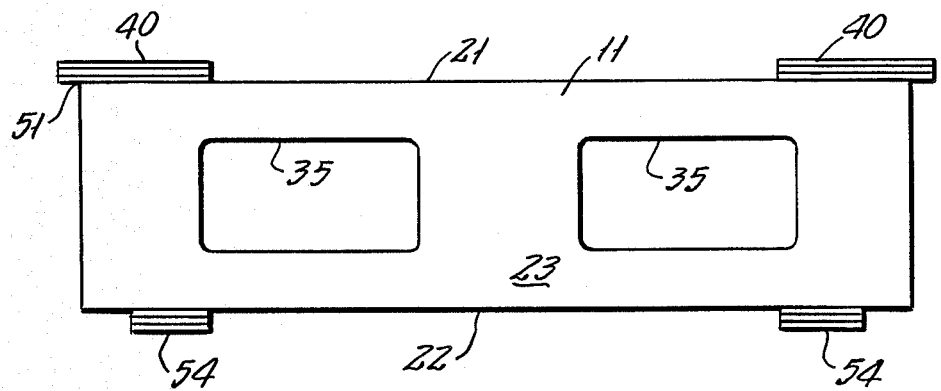
FIG. 2 is a side elevational view thereof.

Secured to the upper surface of the upper wall 40 are four generally L-shaped tabs 40, 41, 42, and 43, each bounded by outer edges 44 and 45, inner edges 46 and 47, as well as end edges 48 and 49 to define a V-shaped recess. As best seen in FIG. 2, the tabs 40–43 are secured by gluing or otherwise such that they extend outwardly of the longitudinal edges 50 and end edges 51 of the upper wall 21, thus preventing the side walls 23 and/or the end flaps 24 from directly abutting a parallel surface, thus blocking the openings 34–38.

Also, as best seen in FIG. 2, the lower wall 22 is provided with generally rectangularly shaped tabs 54 which are positioned upon the under surface of the lower wall so that when a pair of devices 10 are placed in stacked relation, the tabs 44 will engage the recesses 49 in the tabs 40–43, and thus inhibit relative motion between the elements 11 in a horizontal plane. The tabs 40–43, and 54 are all preferably formed from multi-ply corrugated stock so as to provide a substantial height, and corresponding substantial distance between stacked devices.

Figure 3:
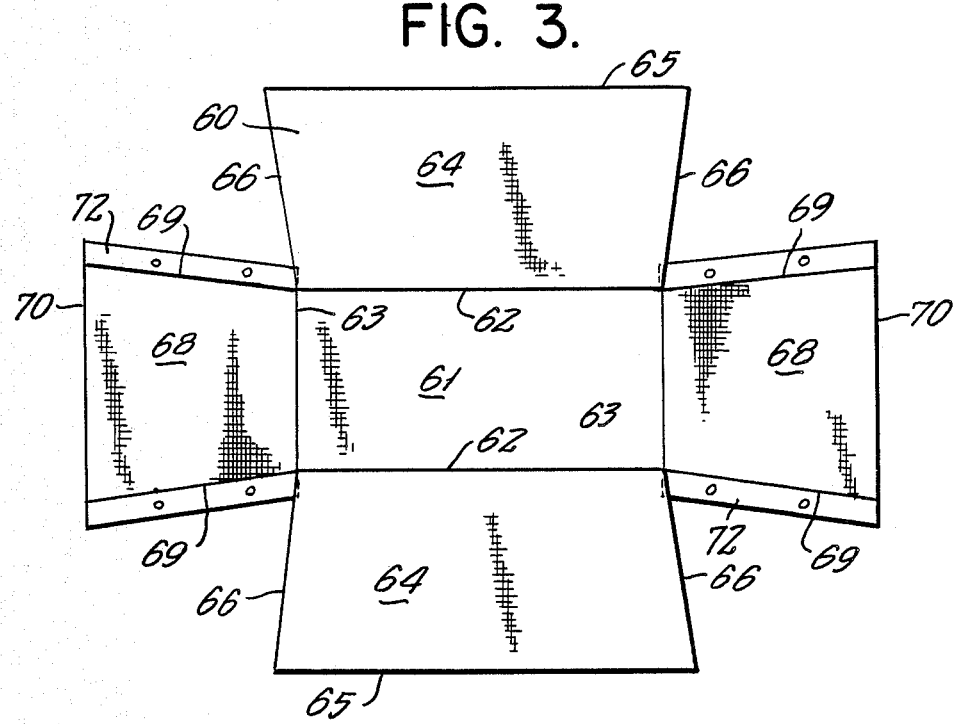
FIG. 3 is a developed view of a unitary blank used to form one of a plurality of inner container elements forming parts of the disclosed embodiment.
Figure 4:
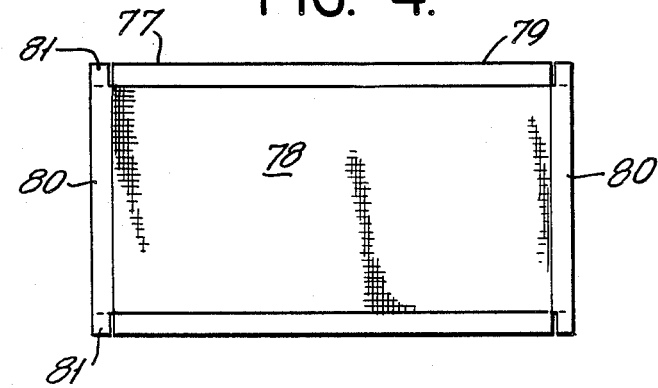
FIG. 4 is a developed view of a blank used to form a cover member for the shown in FIG. 3.
Figure 5:
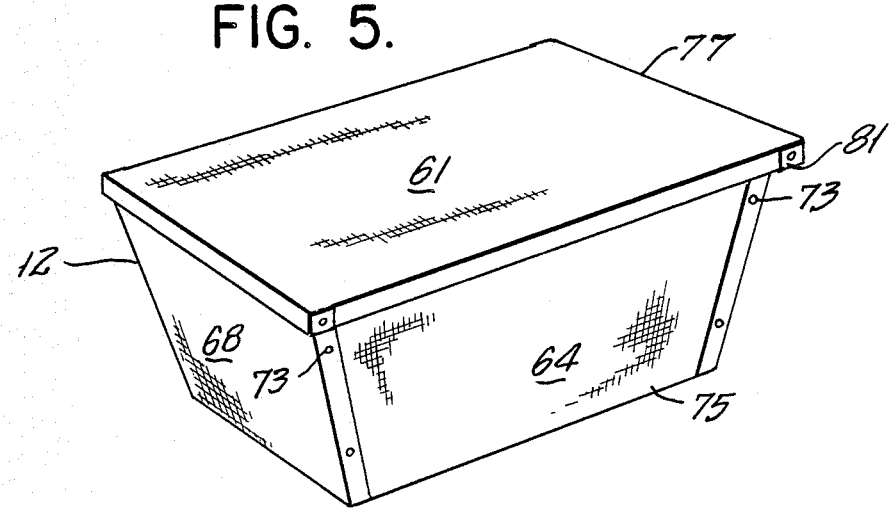
FIG. 5 a is perspective view of an assembled inner container element.

Referring to FIGS. 3, 4 and 5, the inner container element 12 is formed from a unitary planar blank of wire cloth 60 or similar material. It includes a rectangular bottom wall 61 bounded by longitudinal edges 62 and end edges 63 to which are foldably associated a pair of oppositely disposed trapezoidally-shaped side walls 64, bounded by an upper edge 65 and side edges 66. Correspondingly, trapezoidally-shaped end walls 68 are bounded by side edges 69 and an upper edge 70. Flaps 72 depend from the edges 79 and are interconnected to corresponding areas on the side walls 64 by spot-welding 73 or equivalent adhesive bonding.

Selectively overlying the receptacle formed by the blank 60 is a rectangular lid 77 including a planar top wall 78 and a peripheral rim 79 having end members 80 provided with flaps 81 for similar spot-welding.

The devices 10 are readied for use by bringing the outer container element 11 to erected condition and closing one open end thereof using a clip 30. Next, the inner container elements which may be maintained in nested condition prior to use are loaded with the desired number of laboratory animals, at which time provision can be made for a supply of food and water sufficient for the period of shipment. The lids 77 are frictionally retained upon the receptacle 75, and once they are inserted within the outer container element 11, they cannot be dislodged. Once inserted, the second end of the outer container element 11 is closed, and as many devices 10 as are required may be arranged in a plurality of stacks (not shown) as required. Because of the presence of the tabs 40–43, the stacked devices cannot be placed in a larger container other than slightly spaced relation, in both horizontal and vertical planes, thus assuring adequate flow of air to the interior of the inner container elements 12.

Upon arrival at a destination, the outer container elements are easily opened by removal of one or both of the clips 30, and the inner container elements 12 are slid therefrom. For a reasonable period of time, the inner container elements may be used as storage cages, and where the animals are to be used during such period, it is not necessary to transfer them to other quarters. The outer container elements may be collapsed for storage and return shipment, if desired, or discarded. The inner container elements 12, when emptied, can be conveniently flushed, dried and nested for a return shipment, or other disposal.

I wish it to be understood that I do not consider the invention to be limited to the precise details of structure shown and set forth in this specification, for obvious modifications will occur to those skilled in the art to which the invention pertains.

I claim:

1. A container for shipping laboratory animals comprising: an outer container element and at least one inner container element selectively positionable within said outer container element; said outer container element being formed of corrugated material and including an upper wall, a lower wall, a pair of side walls, and plural flaps forming closures at first and second ends thereof; said upper wall and at least one of said side wall and end flaps having through openings therein for the circulation of ambient air therethrough when said outer container is in assembled closed condition. Said upper wall having an upper surface, a plurality of planar generally L-shaped tabs secured to said upper surface at the corners thereof in such location that a pair of mutually perpendicular corners thereof extend outwardly beyond said corners; whereby upon the stacking of a plurality of said outer containers, said tabs maintain a predetermined distance between said upper surface of one container and a lower surface of a second container supported immediately thereabove to provide a path for the flowing of air through said opening in said upper wall thereof.

2. A container in accordance with claim 1, further comprising a second plurality of planar tabs positioned upon an under surface of said lower wall, said second plurality of tabs being selectively engageable with corresponding ones of said first plurality of tabs, upon the stacking of a pair of outer container elements to inhibit relative displacement therebetween in a plane parallel to said upper and lower walls.

3. A container in accordance with claim 2, further characterized in said first and second pluralities of tabs being formed of multi-ply corrugated material.

* * * * *